United States Patent [19]

Gelardi et al.

[11] 4,426,056
[45] Jan. 17, 1984

[54] PLATE BRACKET FOR MOUNTING A CASSETTE BOX

[75] Inventors: Anthony L. Gelardi; Paul J. Gelardi, both of Cape Porpoise; Robert B. MacLeod, Jr., Biddeford, all of Me.

[73] Assignee: Shape Inc., Biddeford, Me.

[21] Appl. No.: 249,681

[22] Filed: Mar. 31, 1981

[51] Int. Cl.³ ............................................. A47B 96/06
[52] U.S. Cl. ................................. 248/225.1; 206/387; 220/23.4; 312/12
[58] Field of Search .......................... 248/225.1, 233.4; 312/9, 12, 14, 107, 111; 206/387, 601, 821; 220/23.4

[56] References Cited

U.S. PATENT DOCUMENTS

| | | | |
|---|---|---|---|
| 1,888,055 | 11/1932 | Tobin et al. | 52/105 |
| 3,116,030 | 12/1963 | Leotta | 242/55.2 |
| 3,635,350 | 1/1972 | Wolf | 211/40 |
| 3,642,337 | 2/1972 | Manheim | 312/111 |
| 3,822,049 | 7/1974 | Saunders | 248/225.1 |
| 3,851,936 | 12/1974 | Muller | 312/111 X |
| 3,899,229 | 8/1975 | Ackeret | 312/10 |
| 4,216,857 | 8/1980 | Huang | 206/1.5 |
| 4,275,943 | 6/1981 | Gelardi et al. | 312/319 |
| 4,293,072 | 10/1981 | Hill et al. | 206/821 X |
| 4,320,613 | 3/1982 | Kaufman | 52/748 |
| 4,332,052 | 6/1982 | Remington | 248/225.1 X |

Primary Examiner—J. Franklin Foss
Assistant Examiner—David L. Talbott
Attorney, Agent, or Firm—Staas & Halsey

[57] ABSTRACT

A bracket for mounting a cassettebox that includes a flat substantially thin rectangular plate member attachable to a table, shelf or other like surface. Integrally formed on the flat plate member are alignment and locking elements formed along the side edges of the flat plate member for positioning a flat plate member of another bracket in side engaging alignment thereto, so that cassetteboxes mounted on adjacent brackets are aligned with each other in side-by-side relationship. In addition, there are provided male beveled side edges integrally formed along the front portion of the flat plate member for insertion into female dovetail grooves formed along the bottom side edges of the cassettebox. Flanges are formed along the non-beveled rear portions of the side edges of the flat plate member for aligning engagement with and positioning thereon track members formed along bottom side edges of the cassettebox that is to be mounted onto the bracket. At least one female notch is formed in the front edge of the flat plate member for engagement with at least one male nodule formed at the front bottom edge of the cassettebox that is to be connected to the bracket. All of the above elements can be formed of a single piece of molded material to provide an inexpensive mass-produced mounting bracket of a simple and small configuration, but one that is versatile and ensures a proper mounting function for the cassettebox.

20 Claims, 9 Drawing Figures

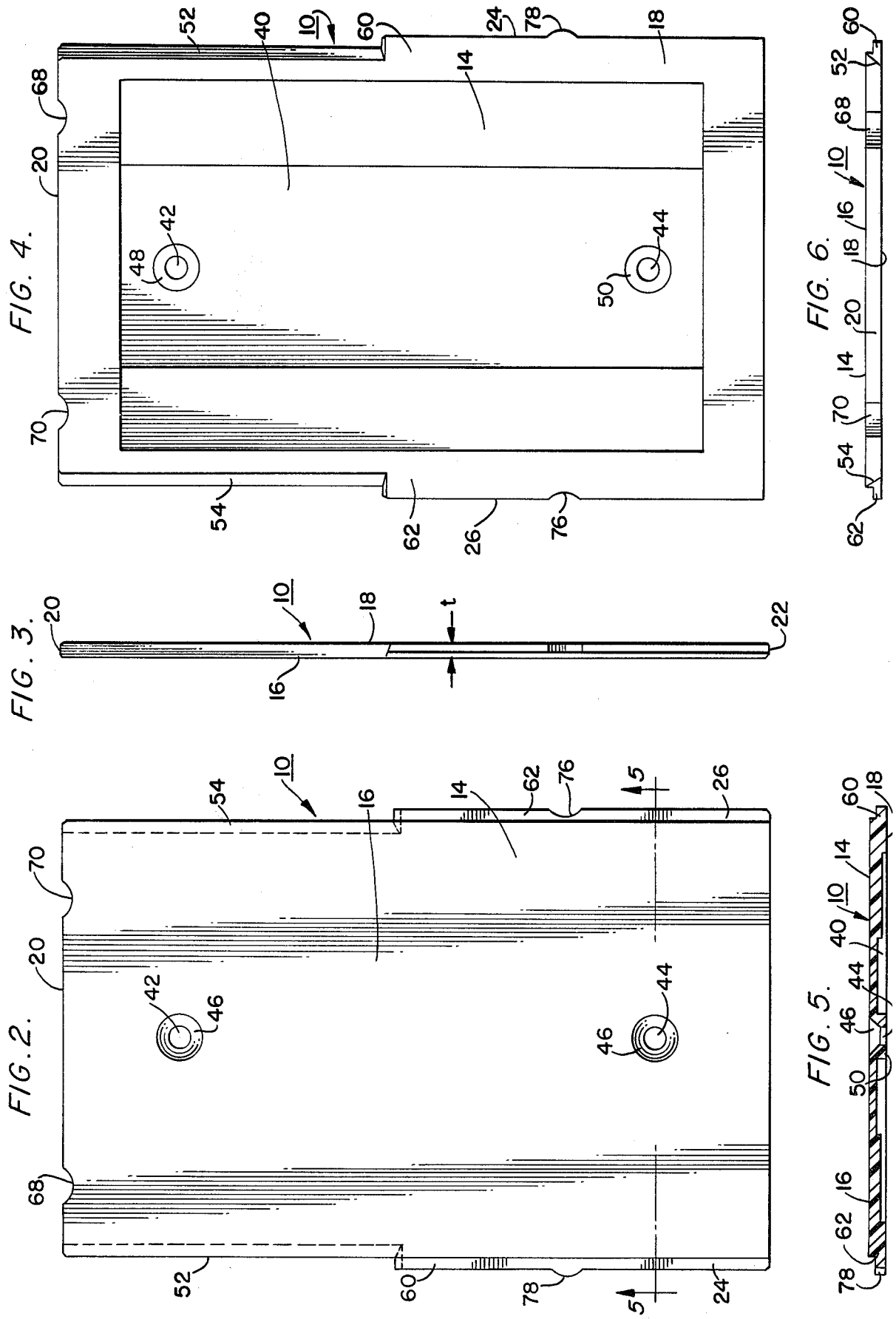

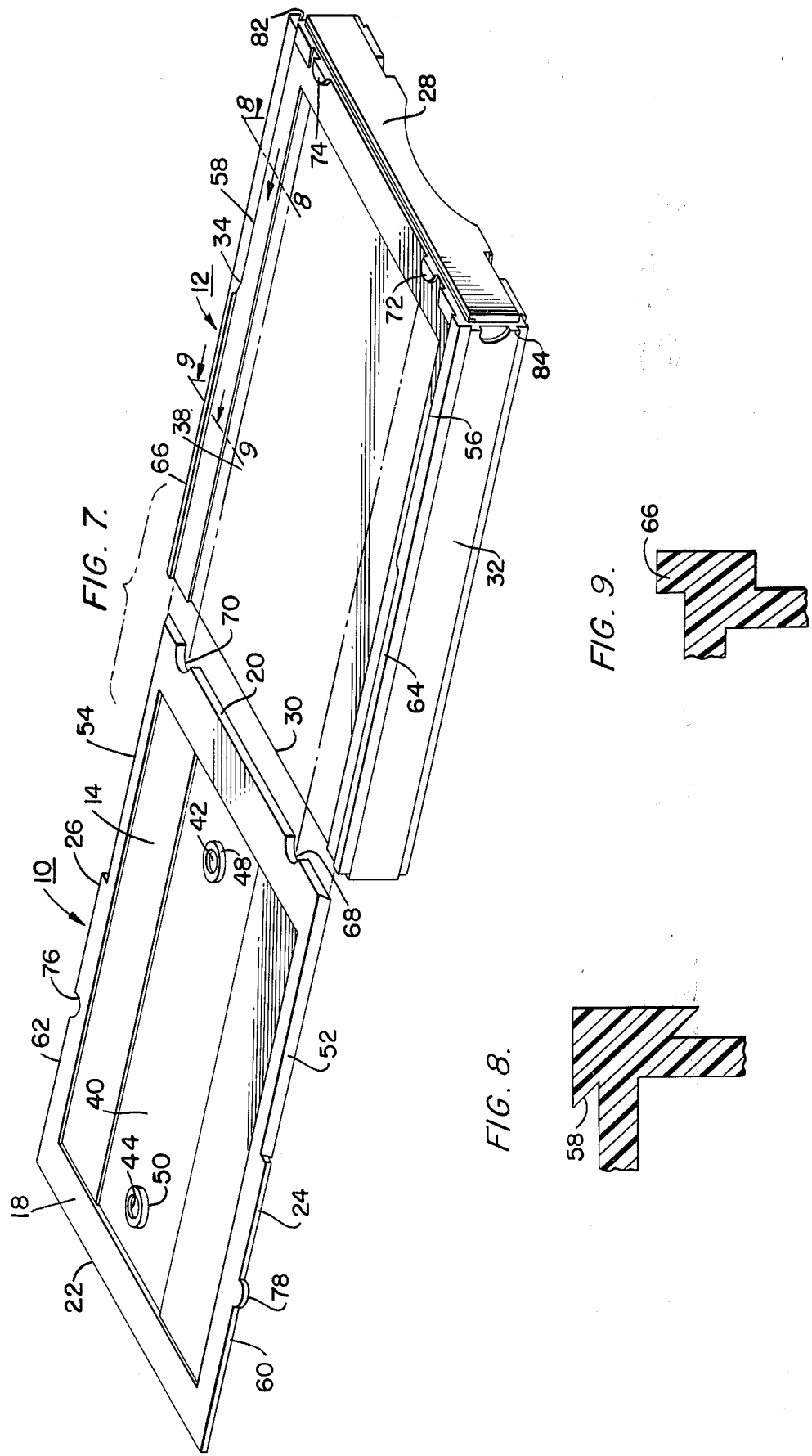

PLATE BRACKET FOR MOUNTING A CASSETTE BOX

BACKGROUND OF THE INVENTION

The present invention relates to a bracket for mounting a cassettebox and, more particularly, to a substantially thin, flat plate bracket for mounting a cassettebox and which is formed of a single piece of molded material.

Various forms of cassette containers for storing tape cassettes or other like recording tapes have been proposed. For example, cassette containers are known which have a generally box-like shaped housing and a spring-biased drawer for holding the cassette slidably received in the housing.

It has also been known to store a number of cassettes in a block system of a plurality of cassette storage containers. One method is to integrally form the cassette container units together in a storage rack configuration. Another method has been to detachably connect separate cassette containers one above the other and sideways in a modular storage system. It is highly advantageous to use the detachably connectable separate cassette containers so that the block of containers can be added to or subtracted from depending upon the desired storage, as well as having the ability to utilize separately only one of the cassette containers.

One particular object for the modular-type system, i.e. using individual cassette containers, is to provide a modular-type system where the plurality of cassette containers can be quickly and easily connected, a modular-type system where there is no interference during the insertion and removal of a cassette from an adjacent connected cassette container, a modular system that provides secure attachment of all of the containers, a modular system which minimizes space when a plurality of the cassette containers are connected together, and one which provides quick and easy alignment between all of the containers of the modular-type system. To achieve the foregoing objects in a cassette container and a modular-type storage system, a cassettebox has been developed, such as described in the commonly-assigned U.S. patent application Ser. No. 135,886 filed on Mar. 31, 1980 entitled "A Container For A Cassette".

In addition to the foregoing, it is particularly advantageous for such a cassettebox or a modular-type cassettebox storage system as described above to be permanently mounted on a surface, such as on an automobile dashboard, or on a table. In providing mounting for a modular-type cassette container storage system, several brackets have been developed but with distinct disadvantages. A mounting bracket needs to be versatile in that mounting may be desirable for merely a vertical stack of cassetteboxes or a plurality of cassetteboxes interconnected in both a side-by-side relationship and in a vertical stack. A mounting bracket also should be small, particularly for packaging with a cassettebox, extremely simple to use, provide secure, quick, and easy detachable connection of the cassettebox to the bracket, provide alignment of the cassetteboxes to the mounting bracket and to the other mounted containers, provide a proper and easy mounting of the bracket to its mounting surface, and be inexpensive to manufacture.

SUMMARY OF THE INVENTION

Accordingly, it is a primary object of this invention to provide a bracket for mounting a plurality of cassetteboxes in a modular-type storage system either in a vertical, side-by-side, or vertical and side-by-side block configuration.

Another object of this invention is to provide the mounting bracket with the feature set forth above that is small and one having minimum overall dimensions compatible with and no greater then the overall dimensions of the cassettebox.

A further object of this invention is to provide the above-described mounting bracket that is of a simple structural configuration yet one that ensures quick, easy and smooth interconnection of the cassettebox to the bracket.

Still another object of this invention is to provide a mounting bracket with the features set forth above which ensures mounting to the surface of the table or the like without warping, misalignment or variation in the bracket connecting surface for the cassettebox.

Finally, it is an object of this invention to provide the above-described mounting bracket formed of a single piece of molded material and which is inexpensively mass produced.

Additional objects and advantages of the invention will be set forth in part in the Description which follows, and in part will be obvious from the Description, or may be learned by practice of the invention. The objects and advantages of the invention may be realized and obtained by means of the instrumentalities and combinations particularly pointed out in the appended claims.

To achieve the foregoing objects and in accordance with the purpose of this invention, as embodied and broadly described herein, there is provided a flat bracket for mounting a cassettebox having interconnect means formed along the bottom side edges thereof and alignment and locking means formed along the front bottom edge thereof comprising: (1) a flat substantially thin, rectangular plate member attachable to a table, shelf or other like surface; (2) interconnect means formed along the side edges of the flat plate member for mating with the corresponding interconnect means of the cassettebox, wherein the cassettebox is held on top of the flat plate member; (3) first alignment and locking means formed along the front edge of the flat plate member engageable with the alignment and locking means of the cassettebox for positioning the cassettebox in front even alignment on top of the flat plate member; and (4) second alignment and locking means formed along the side edges of the flat plate member for positioning a flat plate member of another mounting bracket in side engaging alignment thereto, wherein the cassetteboxes held on adjacent mounting brackets are aligned with each other in side-by-side relationship.

In the preferred embodiment, the second alignment and locking means of the mounting bracket comprises a female notch formed in one side edge of the flat plate member and a male nodule formed on the other side edge of the flat plate member, wherein the male nodule of the flat plate member is mateable with the female notch of a flat plate member of an adjacent side-aligned mounting bracket. The first alignment and locking means comprises at least one female notch formed in the front edge of the flat plate member for engagement with at least one male nodule formed at the front bottom edge of the cassettebox connected to the mounting bracket.

Further, in the preferred embodiment, the interconnect means of the mounting bracket comprises male beveled side edges of the flat plate member formed only along the front portion of the flat plate member for allowing easy alignment and insertion of corresponding female dovetail grooves formed only along the front portion of the bottom side edges of the cassettebox. In this particular embodiment, the male nodule and female nodule of the second alignment and locking means are formed along the nonbeveled rear portion of the side edges of the flat plate member.

In the preferred embodiment, the mounting bracket further comprises flanges formed along the rear portions of the side edges of the flat plate member for aligning engagement with and positioning thereon track ribs formed along the bottom side edges of the cassettebox. In this particular embodiment, the female notch and the male notch of the second alignment and locking means are formed along the flanges so that the corresponding flanges of side aligned mounting brackets abut each other and wherein a space is formed between the corresponding front beveled side edges of the side aligned mounting brackets for easy positioning of the respective cassetteboxes onto the mounting brackets.

Finally, the preferred embodiments of this mounting bracket has a relief formed in the central portion of the bottom surface of the flat plate member, except around screw apertures formed therethrough for receiving mounting screws, for flush attachment of the flat mounting bracket to a table, shelf or like surface without warping or cupping of the flat plate member and for affixing an identifying logo, label or the like to the flat plate member without interference with the flush attachment of the flat plate member to the table, shelf, or other like surface.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 2 is a top view of the flat mounting bracket shown in FIG. 1, illustrating in particular the male beveled side edges along the front portion of the flat plate member and the relief formed in the central portion of the bottom surface of the flat plate member;

FIG. 3 is a side view of the flat mounting bracket shown in FIG. 1, illustrating in particular the thickness "t";

FIG. 4 is a bottom view of the flat mounting bracket shown in FIG. 1, illustrating in particular the male beveled side edges along the front portion of the flat plate member and the relief formed in the central portion of the bottom surface of the flat plate member;

FIG. 5 is a side cross-sectional view, taken along the line 5—5 in FIG. 2, illustrating in particular the flanges formed along the rear portions of the side edges of the flat plate member and the relief formed in the central portion of the bottom surface of the flat plate member;

FIG. 6 is a side view of the front edge of the mounting bracket shown in FIG. 2, illustrating in particular the male beveled side edges formed along the front portion of the flat plate member, the female notches formed in the front edge of the flat plate member, and the flanges formed along the rear portions of the side edges of the flat plate member;

FIG. 7 is a bottom perspective view of the flat mounting bracket in accordance with the invention and a cassettebox for connection thereto, and illustrating in particular the interconnecting and alignment of the cassettebox onto the bracket;

FIG. 8 is a partial cross-sectional view, taken along the line 8—8 in FIG. 7, illustrating the interconnect means formed along the front portion of the bottom side edges of the cassettebox; and FIG. 9 is a partial cross-sectional view, taken along the line 9—9 in FIG. 7, illustrating track ribs formed along the bottom side edges of the cassettebox.

DETAILED DESCRIPTION OF THE PREFERRED EMBODIMENT

Figure 1:
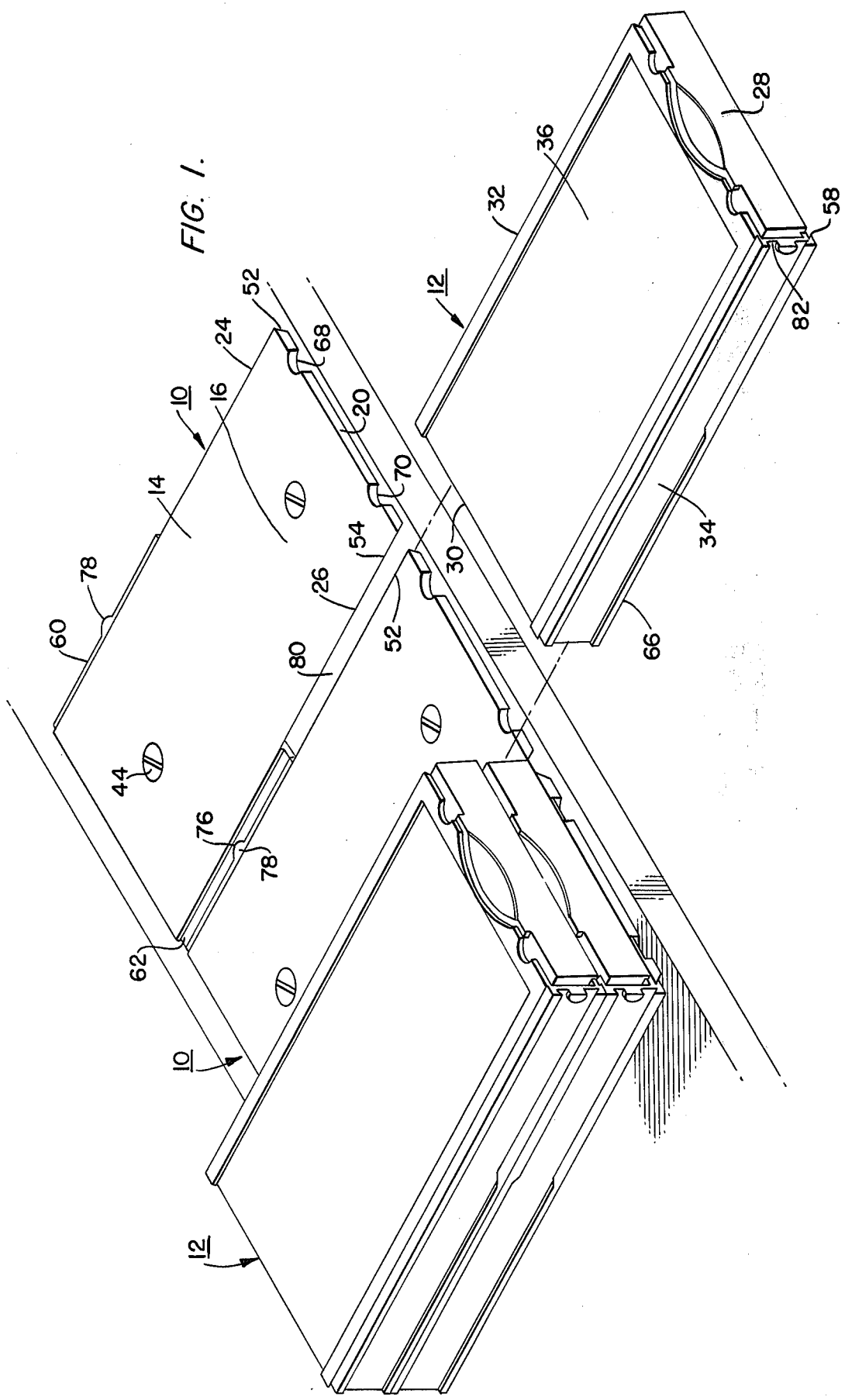
FIG. 1 is a perspective view of a series of the flat mounting brackets in accordance with the invention showing them in aligned and locking engagement to each other in side-by-side relationship, and illustrating in particular the manner of interconnecting the cassetteboxes onto the bracket.

Reference will now be made in detail to the present preferred embodiment of the invention, an example of which is illustrated in the accompanying drawings.

In accordance with the invention and as best illustrated in FIGS. 1 and 7, there is provided a flat bracket, generally designated by reference numeral 10, for mounting a cassettebox container, generally designated by the reference numeral 12. In the preferred embodiment, the flat mounting bracket 10 basically comprises four components: (1) a flat substantially thin rectangular plate member attachable to a table, shelf or like surface; (2) interconnect means formed along the side edges of the flat plate member for mating with corresponding interconnect means of the cassettebox, wherein the cassettebox is held on top of the flat plate member; (3) first alignment and locking means formed along the front edge of the flat plate member engageable with the alignment and locking means of the cassettebox for positioning the cassettebox on top of the flat plate member in front evenalignment with the flat plate member; and (4) second alignment and locking means formed along the side edges of the flat plate member for positioning a flat plate member of another flat mounting bracket in side engaging alignment thereto, wherein the cassetteboxes held on adjacent mounting brackets are aligned with each other in side-by-side relationship. As will be described hereafter in greater detail, the plate member, interconnect means, and the first and second alignment and locking means have particular configurations in the preferred embodiment for providing a simple configuration and quick and easy interconnection, alignment and locking functions for the mounting bracket. The design of the components of the flat mounting bracket, moreover, are such to allow high volume, low cost and easy mass production of the flat mounting bracket. This is achieved principally by being able to form the entire flat mounting bracket with the four basic components of a single piece of molded material. The design of this mounting bracket with the four components has also been developed to provide a very compact and reliable yet versatile mounting bracket. That is, the dimensions of the bracket have been minimized and a plurality of these mounting brackets can be interlocked and aligned together to mount cassetteboxes in a modular block system either in side-by-side or vertical relationship.

As embodied herein, the flat substantially thin rectangular plate member of the bracket 10 which is attachable to a table, shelf or other like surface is shown in FIGS. 1-7 as element 14. To facilitate describing the embodiment of this invention, "top", "bottom", "front", "back", "side", and similar terms are used herein, but it should be understood that these terms refer to the structure of the depicted mounting bracket as shown in the drawings and should not be construed in a manner to limit the scope of the invention. Accordingly, the plate member 14 comprises a top surface 16 on which the cassettebox 12 is mounted, a bottom surface 18 which is attachable to a table, shelf or other like surface, a front edge 20 facing the cassettebox for insertion thereon, a back edge 22, and side edges 24 and 26. As seen in FIG. 3, this plate member 14 further has a thickness designated by the reference letter "t". As can be seen from FIGS. 1 and 7, the cassettebox 12 has a box-like configuration with forward and rear ends 28 and 30, respectively, sides 32 and 34, and top and bottom surfaces 36 and 38, respectively.

As will be described in greater detail below, because of the use of the particular interconnect means, and first and second alignment and locking means formed on the above flat plate member 14, the plate member 14 can be formed having rectangular outer length and width dimensions substantially equal to the outer length and width dimensions of the bottom of the cassettebox, as best seen in FIGS. 1 and 7, and a very substantially thin thickness dimension "t", as best seen in FIG. 3. In the preferred embodiment, this plate member 14 has a thickness dimension "t" of approximately from 0.075 to 0.150 inches. Accordingly, when plate member 14 is mounted on a table, shelf or other like surface, the mounting bracket lies substantially flush with the horizontal surface when a cassettebox 12 or a plurality of cassetteboxes 12 are not mounted thereon. The advantages of this can be readily seen from a marketing and practical standpoint in that no bulky projections or parts of the bracket extend up from the table surface during non-mounting of the cassetteboxes. It can also be seen that due to the flat substantially thin thickness and rectangular dimensions of this plate member 14, this mounting bracket can be connected to a cassettebox integral therewith without projections and protrusions so as to be able to provide a small package of the cassettebox 12 and the mounting bracket 10 together for marketing and sales.

In addition to the foregoing, as best seen in FIGS. 4 and 5, the plate member 12 of the preferred embodiment has a relief portion 40 formed in the central area of the bottom surface 18. This relief portion serves two functions. Firstly, the central relief portion 40 formed in the bottom surface 18 of the plate member 14 has been found to enhance proper flush attachment of the mounting bracket 10 to the table, shelf or other like horizontal surface without warping or cupping of the plate member 14. Thus, this ensures a proper top mounting surface 16 for the cassettebox on the bracket. Secondly, this relief portion 40 allows for affixing identifying or other market logos, labels or the like to the plate member 14 without interference with the flush attachment of the flat plate member 14 to the table, shelf or other like surface.

As embodied herein, in order to attach the plate member 14 to the table, shelf or other like surface, the plate member 14 has a pair of apertures 42 and 44 formed therethrough for receiving mounting screws. As best seen in FIGS. 2 and 5, these apertures 42 and 44 have chamfered surfaces 46 for receiving screws flush with the top surface 16 of the plate member. This prevents interference with the bottom surface 38 of the cassettebox 12 when mounted onto the top surface 16 of the flat plate member 14. As can also be seen from FIGS. 4, 5 and 7, in the embodiment of the plate member 14 wherein a central relief portion 40 is formed in the bottom surface thereof, there is no relief formed around the screw apertures 42 and 44 but instead there are extended walls 48 and 50, to form a central mounting surface for the plate member 14 of the same thickness as the remaining portions of the plate member. It can thus be seen that in this combination of a substantially thin flat plate member 14 having a central relief 40, screw apertures 42 and 44, and extended walls 48 and 50, that a reliable mounting of the bracket 10 can be made onto a flat surface of a table or shelf without cupping or warping of the top surface 16 onto which the cassettebox 12 is interconnected.

To interconnect the cassettebox 12 to the plate member 14 of the mounting bracket 10 and in accordance with the invention, there is provided the interconnect means formed along the side edges of the flat plate member 14 for mating with corresponding interconnect means of the cassettebox 12, wherein the cassettebox is held on the top surface 16 of the flat plate member 14. As embodied herein and as best seen in FIGS. 2, 4, and 7, this interconnect means of the bracket 10 comprises male beveled side edges 52 and 54 formed along the front side edge portions of the flat plate member 14 for insertion into female dovetailed grooves 56 and 58, respectively, formed along the bottom side edges of the cassettebox 12. The female groove 58 of the cassettebox is further shown in cross-section in FIG. 8. It can be further seen from FIGS. 1 and 7 that by providing the male beveled side edges 52 and 54 only along the front portion of the flat plate member 14, there is an extremely easy alignment and insertion of the corresponding female dovetail grooves 56 and 58 of the cassettebox 12 if those female grooves of the cassettebox are also only provided on the front portion of the bottom side edges of the cassettebox.

As embodied herein and as best seen in FIGS. 2, 4, 5, 6, and 7, to provide an even easier alignment and positioning of the cassettebox 12 onto the mounting bracket 10, the bracket further comprises flanges 60 and 62 formed along the rear portions of the side edges of the flat plate member 14 for aligning engagement with and positioning thereon additional track ribs 64 and 66 which can be formed along the bottom side edges of the cassettebox 12. The track rib 66 of the cassettebox is further shown in cross-section in FIG. 8. Thus, during connection of the cassettebox 12 to the mounting bracket 10, the male beveled side edges 52 and 54 of the flat plate member 14 are initially located between the track ribs 64 and 66 (see e.g., FIG. 7) and the cassettebox 12 slid back onto a full mounting position on the bracket 10 (see, e.g., FIG. 1). When the cassettebox 12 is fully mounted on the top surface 16 of the flat plate member 14, the male beveled side edges 52 and 54 are in mating relationship with the female grooves 56 and 58 of the cassettebox, while the track ribs 64 and 66 of the cassettebox rest on the flanges 60 and 62 at the rear portion of the flat plate member 14. This particular design of the mounting bracket allows for a simple and easy interconnection of the cassettebox 12 to the mounting bracket 10 after the mounting bracket has been affixed to the surface of a table, shelf or the like. It can be further seen that this design facilitates interconnection of the cassettebox to the flat mounting bracket when the flat mounting bracket is of a substantially thin thickness and mounted flush with the horizontal surface of the table, shelf or the like.

To ensure that a cassettebox 12 which is to be connected to the mounting bracket 10 is in a proper front even alignment, there is provided the first alignment and locking means formed along the front edge of the flat plate member 14 engageable with corresponding alignment and locking means of the cassettebox. As embodied herein and as best seen in FIGS. 1 and 7, the first alignment and locking means of the bracket comprises a pair of female notches 68 and 70 formed in the front edge 20 of the plate member 14 for engagement with a pair of male nodules 72 and 74, respectively, formed at the front bottom edge of the cassettebox that is to be connected to the mounting bracket. This type of alignment and locking means also allows for a simple and easy integral molding of the alignment and locking means as a part of the flat plate member 14. It can also be seen that this particular alignment and locking means configuration not only provides for an even front end positioning of a cassettebox 12 mounted directly on top of the mounting bracket 10, but also the other cassetteboxes mounted vertically on top of the first cassettebox 12. As will be described hereafter and as seen in FIG. 1, when additional cassetteboxes are mounted on side-by-side adjacent mounting brackets 10, this front end alignment is essential to form a proper modular block system of cassetteboxes.

As briefly noted above, to build a modular integral system of cassettebox containers 12, there is provided for the mounting bracket the second alignment and locking means formed along the side edges 24 and 26 of the flat plate member 14 for positioning a flat plate member of another mounting bracket in side engagement alignment thereto, wherein cassetteboxes held on adjacent mounting brackets are aligned with each other in side-by-side relationship. As embodied herein, this second alignment and locking means comprises a female notch 76 formed on one side edge of the flat plate member 14 and a male nodule 78 formed on the other side edge of the flat plate member 14. This is best seen in the top and bottom views of the plate member 14 shown in FIGS. 2 and 4. In the preferred embodiment of the mounting bracket 10 described previously having the flanges 60 and 62 formed along the rear portion of the plate member side edges, the male nodule 78 and female notch 76 are formed along the nonbeveled rear portions of the side edges 24 and 26 which constitute the flanges 60 and 62.

As best seen in FIG. 1, one flat plate member 14 of a mounting bracket 10 can be aligned and locked in side-by-side relationship with another flat plate member 14 of a mounting bracket 10, by locking the female notch 76 of the flat plate member of the first mounting bracket into engagement with the male nodule 78 of the flat plate member of the adjacent second mounting bracket. In the preferred embodiment where flanges 60 and 62 are provided on the side edges 24 and 26 of the plate member 14, one of the flanges, such as the flange 62 formed on the side edge 26 of one plate member 14, abuts the flange 60 formed on the opposing side edge 24 of the other adjacent and side-aligned mounting bracket so that a space 80 is formed between the corresponding front beveled side edges 52 and 54 of the sidealigned mounting brackets.

It can be seen from the foregoing that the particular design of the side-alignment and locking means provide for easy positioning and connection of the respective cassetteboxes onto the mounting brackets. It can also be seen from the foregoing that this particular side-alignment and locking means configuration not only provides for an even front end alignment of the adjacent mounting brackets, but one that provides for simple and easy locking and one that allows for fixing the mounting brackets to a table, shelf or like surface in a front and side aligned position prior to connecting the cassetteboxes onto the mounting brackets. Finally, it can also be seen from the foregoing that the combination of this particular side-alignment and locking means configuration with the front end alignment and locking means of the mounting bracket 10 provides for construction of a proper modular block system of cassetteboxes 12 onto the brackets, as best shown in FIG. 1.

This particular type of alignment and locking means between adjacent mounting brackets 10 becomes particularly advantageous when the cassetteboxes, as depicted in FIGS. 1 and 7, further include interconnect means on their side walls. For example, these side interconnect means on the plurality of cassetteboxes can include female dovetail mating edges 82 formed along the front portion of one sidewall 34 and male dovetail mating edges 84 formed along the other sidewall 32 so that the two cassetteboxes are also connected together in side-by-side relationship on the mounting brackets. With this type of cassettebox, it becomes advantageous to properly align the mounting brackets 10 in side-by-side relationship to form a proper modular block system of the cassetteboxes which are integrally connected together in both the vertical and horizontal relationship.

From a review of the foregoing written description of the preferred embodiment and accompanying drawings, one can see that the mounting bracket of this invention achieves a combination of advantages and improvements in the art. First, the mounting bracket of the invention of the type disclosed and described above is simple in construction and has components which can be readily formed of a single piece of injected molded material. Secondly, the above-described mounting bracket is of small dimension and size having a substantially thin thickness and small rectangular configuration for mounting purposes on a table, shelf or other like surface and for packaging with a cassettebox. Thirdly, the above-described mounting bracket provides for a highly reliable mounting of the bracket onto the table, shelf or other like surface without cupping or warping of the top surface for mounting the cassettebox. Fourthly, the above type of mounting bracket allows for a simple, easy and fast mounting of a cassettebox onto the mounting bracket. Finally, the mounting bracket of the type described above allows for formation of an exceptionally good modular block system of interconnected cassetteboxes either stacked vertically on top of one mounting bracket, in side-by-side relationship on a plurality of adjacent mounting brackets, or both vertically and in side-by-side relationship.

It will be apparent to those skilled in the art that modifications and variations could be made to the above mounting bracket for holding a cassettebox in accordance with the teachings of the invention without departing from the spirit or scope of the invention. Thus, it is intended that the present invention cover the modifications and variations of this invention within the scope of the appended claims and their equivalents.

What we claim is:

1. A flat bracket for mounting a cassettebox having interconnect means formed along the bottom side edges thereof and alignment and locking means formed along the front bottom edge thereof, said bracket comprising:

(a) a flat substantially thin rectangular plate member attachable to a table, shelf or other like surface and having apertures formed therethrough for receiving screws for mounting said flat plate member to the table, shelf or other like surface, and wherein the bottom surface of said flat plate member has a relief formed in the central portion thereof except around said screw apertures for flush attachment of said flat mounting bracket to a table, shelf or other like surface without warping or cupping of said flat plat member and for affixing an identifying logo, label or the like to said flat plate member without interference with the flush attachment of said flat plate member to the table, shelf or other like surface;

(b) interconnect means formed along the side edges of said flat plate member for mating with the corresponding interconnect means of the cassettebox, wherein the cassettebox is held on top of said flat plate member;

(c) first alignment and locking means comprising at least one female notch formed in the front edge of said flat plate member for engagement with at least one male nodule formed at the front bottom edge of the cassettebox connected to the mounting bracket for positioning the cassettebox on top of said flat plate member in front even-alignment with said flat plate member; and (d) second alignment and locking means comprising a female notch formed in one side edge of said flat plate member and a male nodule formed on the other side edge of said flat plate member, wherein the male nodule of the flat plate member is mateable with the female notch of a flat plate member of an adjacent mounting bracket for side engagement alignment thereto, wherein the cassetteboxes held on adjacent mounting brackets are aligned with each other in side-by-side relationship, and wherein said flat plate member, interconnect means, and first and second alignment and locking means are formed of a single integral piece of molded material.

2. The bracket of claim 1, wherein said interconnect means comprises male beveled side edges of said flat plate member for insertion into female dovetail grooves formed along the bottom side edges of the cassettebox container.

3. The bracket of claim 2, wherein said male beveled side edges are formed only along the front portion of said flat plate member for allowing easy alignment and insertion of the corresponding female dovetail grooves formed only along the front portion of the bottom side edges of the cassettebox.

4. The bracket of claim 3, wherein said male nodule and female notch of said second alignment and locking means are formed along the non-beveled rear portion of the side edges of said flat plate member.

5. The bracket of claim 3, wherein said flat mounting bracket further comprises flanges formed along the rear portions of said side edges of said flat plate member for aligning engagement with and positioning thereon track ribs formed along the bottom side edges of the cassettebox.

6. The bracket of claim 5, wherein said female notch and male nodule of said second alignment and locking means are formed along the flanges, so that the corresponding flanges of side aligned mounting brackets abut each other and wherein a space is formed between the corresponding front beveled side edges of the side aligned mounting brackets for easy positioning of respective cassetteboxes onto the mounting brackets.

7. The bracket of claim 1, wherein said apertures have chamfered surfaces for receiving and mounting said screws flush with the top surface of said flat plate member for preventing interference with the bottom surface of the cassette container mounted on said flat plate member.

8. The bracket of claim 1, wherein said rectangular plate member has outer length and width dimensions equal to or less than the outer length and width dimensions of the bottom of said cassettebox for slidable and detachable connection thereto.

9. The bracket of claim 8, wherein said substantially thin rectangular plate member has a thickness dimension approximately from 0.075 to 0.150 inches.

10. A flat bracket for mounting a cassettebox having interconnect means formed along the bottom side edges thereof, said bracket comprising:

(a) a flat substantially thin rectangular plate member attachable to a table, shelf or other like surface and having outer length and width dimensions equal to or less than the outer length and width dimensions of the bottom of said cassettebox container for slidable and detachable connection thereto;

(b) interconnect means formed along the side edges of said flat plate member for mating with the corresponding interconnect means of the cassettebox, wherein the cassettebox is held on top of said flat plate member; and (c) alignment and locking means formed along the side edges of said flat plate member for positioning a flat plate member of another flat mounting bracket in side engaging alignment thereto, wherein the cassetteboxes held on adjacent mounting brackets are aligned with each other in side-by-side relationship, and wherein said flat plate member, interconnect means, and alignment and locking means are formed of a single integral piece of molded material.

11. The bracket of claim 10, wherein said alignment and locking means comprises a female notch formed in one side edge of said flat plate member and a male nodule formed on the other side edge of said flat plate member, and wherein the male nodule of the flat plate member is mateable with the female notch of a flat plate member of an adjacent side-aligned mounting bracket.

12. The bracket of claim 11, wherein said interconnect means comprises male beveled side edges of said flat plate member for insertion into female dovetail grooves formed along the bottom side edges of the cassettebox.

13. The bracket of claim 12, wherein said male beveled side edges are formed only along the front portion of said flat plate member for allowing easy alignment and insertion of the corresponding female dovetail grooves formed only along the front portion of the bottom side edges of the cassettebox.

14. The bracket of claim 13, wherein said male nodule and female notch of said alignment and locking means are formed along the non-beveled rear portion of the side edges of said flat plate member.

15. The bracket of claim 13, wherein said flat mounting bracket further comprises flanges formed along the rear portions of said side edges of said flat plate member for aligning engagement with and positioning thereon track ribs formed along the bottom side edges of the cassettebox.

16. The bracket of claim 15, wherein said female notch and male nodule of said alignment and locking means are formed along the flanges, so that the corresponding flanges of side aligned mounting brackets abut each other and wherein a space is formed between the corresponding front beveled side edges of the side aligned mounting brackets for easy positioning of respective cassetteboxes onto the mounting brackets.

17. The bracket of claim 10, 11, or 12, wherein said flat plate member has apertures formed therethrough for receiving screws for mounting said flat plate member to the table, shelf or other like surface and wherein the bottom surface of said flat plate member has a relief formed in the central portion thereof except around said screw apertures for flush attachment of said flat mounting bracket to the table, shelf or other like surface without warping or cupping of said flat plate member and for affixing an identifying logo, label or the like to said flat plate member without interference with the flush attachment of said flat plate member to the table, shelf or other like surface.

18. The bracket of claim 17, wherein said apertures have chamfered surfaces for receiving and mounting said screws flush with the top surface of said flat plate member for preventing interference with the bottom surface of the cassettebox mounted on said flat plate member.

19. The bracket of claim 10, wherein said substantially thin rectangular plate member has a thickness dimension approximately from 0.075 to 0.150 inches.

20. The bracket of claim 10, 11, 12, or 15, further comprising alignment and locking means having at least one female notch formed in the front edge of said flat plate member for engagement with at least one male nodule formed at the front bottom edge of the cassettebox connected to the mounting bracket for positioning the cassettebox on top of said flat plate member in front even-alignment with said flat plate member.

* * * * *